United States Patent [19]

McWilliams et al.

[11] Patent Number: 5,171,115
[45] Date of Patent: Dec. 15, 1992

[54] SWAGE COLLAR WITH PINTAIL AND FASTENING SYSTEM AND METHOD

[75] Inventors: Dana McWilliams, Acworth, Ga.; Robert D. Travis, Tucson, Ariz.

[73] Assignee: Huck International, Inc., Irvine, Calif.

[21] Appl. No.: 788,098

[22] Filed: Nov. 5, 1991

[51] Int. Cl.⁵ .............. F16B 19/00; B23P 11/00; B21J 9/18
[52] U.S. Cl. .................. 411/361; 411/171; 29/243.522; 72/453.17
[58] Field of Search .............. 411/361, 360, 8, 171; 29/243, 522, 243, 524; 72/453.17, 391.2

[56] References Cited

U.S. PATENT DOCUMENTS

| | | |
|---|---|---|
| 2,583,868 | 1/1952 | Mociun . |
| 3,271,058 | 9/1966 | Anderson .................. 411/361 X |
| 3,645,125 | 2/1972 | Summerlin .................. 29/243.522 |
| 4,326,825 | 4/1982 | Volkmann et al. .......... 411/361 X |
| 4,799,842 | 1/1989 | Kreider et al. . |
| 4,850,771 | 7/1989 | Hurd . |
| 4,850,772 | 7/1989 | Jenkins . |
| 4,977,663 | 12/1990 | Hurd . |
| 5,054,980 | 1/1991 | Bidefeld . |

Primary Examiner—Rodney M. Lindsey
Attorney, Agent, or Firm—Harness, Dickey & Pierce

[57] ABSTRACT

A swage type fastener including a swageable collar member having a pintail member secured thereto to define a pintailed collar; the pintailed collar is operable to be secured to a stud or pin member by an installation tool which applies a relative axial force between the pintail member and collar member to cause a swage anvil to swage the collar member into a locking groove portion on the pintail member and then to sever the pintailed member from the installed collar member; the stud or pin member can have a gripping groove construction at its free end to grip the collar member at initial swage and relatively low swage loads and to resist the installation tool pulling the collar member into the swage anvil instead of swaging it onto the stud or pin member under the subsequently high swage loads.

23 Claims, 5 Drawing Sheets

SWAGE COLLAR WITH PINTAIL AND FASTENING SYSTEM AND METHOD

BACKGROUND AND SUMMARY OF THE INVENTION

The present invention relates to swage type fasteners including a pin or mandrel and a collar adapted to be swaged into a locking portion of the pin and more specifically to a unique form of swage type fastener for use in applications such as a weld stud joint and a related fastening system and method.

Many structures are fastened together with swage type fasteners of a lockbolt type, including a pin and a collar, such as shown in U.S. Pat. No. 2,531,048 issued to L. C. Huck on Nov. 21, 1950 for "Fastening Device", U.S. Pat. Re. No. 30,445 issued to John H. Ruhl on Dec. 16, 1980 for "Fastener With Proportioned Strength Lock Grooves", and U.S. Pat. No. 4,472,096 issued to John Ruhl and Richard D. Dixon on Sep. 18, 1984 for "Optimized Fastener Construction System and Method".

The latter type fasteners are set by an installation tool which applies a relative axial force between the pin and collar via engagement of the collar by a swage anvil and gripping of a pull portion on the pin with a jaw assembly; as the axial force increases the swage anvil on the tool moves axially and radially overengages the collar swaging it into lock grooves in the pin. As the axial force increases further the pull portion or pintail of the pin is severed at a reduced strength portion or breakneck groove and the swaged collar is then ejected from the anvil to complete the installation. Typically the lock grooves are annular, i.e. in a non-threaded form, and thus the swaged connection would not be as susceptible to loosening from vibration as in the case of a threaded connection, i.e. nut and bolt. Even so, however, it is believed that a collar swaged into lock grooves which are in the shape of a thread form are less susceptible to loosening from vibration than the threaded connection from a standard nut and bolt. The present invention while utilizing the swage collar concepts is directed to a unique structure and unique applications such as for use in a weld stud joint. Conventionally a weld stud can be a bolt like member having a head and a threaded shank; the head is adapted to be welded to a support plate or surface to define a threaded stud adapted to cooperate with a nut member to threadably secure other members or workpieces. An example of a weldable stud can be seen in U.S. Pat. No. 4,850,772 issued to J. C. Jenkins on Jul. 25, 1989 for "Friction-Weldable Stud".

In some applications the fastened joint is subject to severe vibrations which could loosen the threaded connection. At the same time it is desirable that the workpieces which are secured by the threaded nut and stud combination be able to be removed for repair, replacement and/or access without damaging the stud and that the joint be secured again with the same stud. This requires that the nut be removable from the stud without damaging the threads on the stud shank. Also in some applications it is desirable that the clamp load applied to the workpieces between the nut and threaded stud shank be relatively low.

As noted, typically in a lock bolt, the collar is swaged into annular lock grooves and hence would not be susceptible to loosening from vibration as with a threaded nut and bolt. Thus a swaged connection would be advantageous if the swaged collar could be removed without damaging the shank and if a new collar could be swaged onto the stud shank when the joint is put together again. In fact tools are available to remove a collar which has been swaged onto a lockbolt like pin without damaging the pin. The above objectives, then, are accomplished by the unique swage collar with pintail structure (pintailed collar) of the present invention. In addition the fastener can be constructed such that the workpieces are clamped together at a relatively low clamp load. In one form of the invention a unique swage anvil is provided with a preselected stop shoulder to limit the axial travel, and hence length of radial overengagement, of the swage anvil relative to the collar member. This combination provides control of the extent of collar member swaged and hence control of the final clamp force exerted on the workpieces. This also assists in providing consistent severance of the excess portion of the pintail structure and collar member.

It is desirable that the amount of protrusion of the weld stud fastener assembly beyond the workpieces secured together be predictable and, in some cases, be minimized. With a threaded weld stud member and associated nut the final protrusion of the set fastener is generally determined by the length of the weld stud member regardless of the overall thickness of workpieces being secured. This can also be accomplished with the pintailed collar of the present invention.

In the present invention a unique weld stud member can be provided for use with the pintailed collar. In one form of the invention, the weld stud member is provided with one or more gripping grooves at its free end which will initially mechanically bond the collar member to the stud member at a relatively low swage load and hence low relative axial force. With this initial mechanical bond the collar member is held onto the stud member and will not be pulled off and into the swage anvil as the relative axial force increases during swage of the collar member onto the larger diameter portions of the pin. This feature is especially important where the degree of reduction of collar material in swage is quite great in order to provide good fill of the associated lockgroove. The present invention then provides a unique weld stud or pin member for use with the pintailed collar. In addition the present invention provides a unique fastening system and method for implementing such system.

While the unique swageable collar member with a pintail is shown as specifically applied in a unique combination with a unique weld stud member it should be understood that such collar member with pintail can be used in combination with other pin or mandrel type members in similar or different applications.

Thus it is an object of the present invention to provide a unique swage type fastener including a swageable collar member with a pintail.

It is another object of the present invention to provide a unique swage type fastener including a unique weld stud member and a swageable collar member with a pintail.

It is another object of the present invention to provide a unique fastening system including a unique swage type fastener including a swageable collar member with a pintail and an installation tool with a unique swage anvil.

It is a general object of the present invention to provide a unique swage type fastener and fastened joint.

It is still another object of the present invention to provide a unique method for implementing the noted fastening systems.

BRIEF DESCRIPTION OF THE DRAWINGS

Other objects, features, and advantages of the present invention will become apparent from the subsequent description and the appended claims, taken in conjunction with the accompanying drawings, in which:

FIG. 1a is a fragmentary view to enlarged scale of the portion of the fastener assembly of FIG. 1 enclosed in the area 1a;

FIG. 2 is a side elevational view of the components of FIG. 1 showing the weld stud member secured to a support plate and in assembled relationship with workpieces to be fastened together by the pintailed collar and with the pintailed collar shown in initial engagement with the installation tool;

DESCRIPTION OF THE PREFERRED EMBODIMENT(S)

Figure 1:
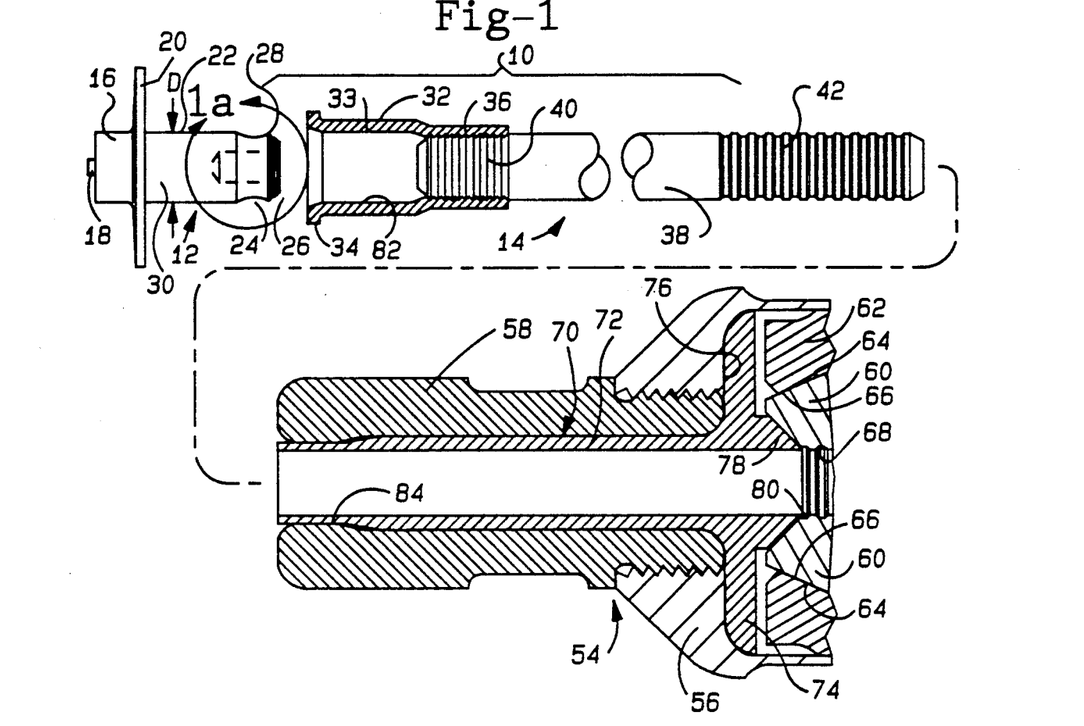
FIG. 1 is an exploded side elevational view with some parts shown in section and others broken away depicting the weld stud fastener assembly of the present invention including a weld stud member and collar member with pintail (pintailed collar) and a fragmentary, longitudinal sectional view of a nose assembly of an installation tool for setting the fastener.

Looking now to FIG. 1 a weld stud fastener assembly 10 includes a weld stud member 12 and a swageable collar member with pintail or pintailed collar 14. The weld stud member 12 has a head portion 16 with a weld button 18 at its free end; the head portion 16 has an enlarged support flange 20 at its opposite end. An elongated shank portion 22 extends axially from the support flange 20 in a direction opposite from the head portion 16. The shank portion 22 has an annular locking groove 24 at its opposite end which terminates in a generally tapered end portion 26. While a single locking groove 24 is shown it should be noted that in some applications a plurality of locking grooves could be used. The axially outer end of the locking groove 24 and the tapered end portion converge to define an annular ridge or corner 28. In one form of the invention the tapered end portion 26 extended axially outwardly and radially inwardly at an angle X of around 15°. At the same time the connecting portion of the locking groove 24 extended at a similar angle whereby the ridge 28 is defined by an included angle of between around 30° to around 45° and hence is relatively sharp for a purpose to be described. In addition, the tapered end portion 26 can be defined by a plurality of radially inwardly extending steps 29 (see FIG. 1a). The steps 29 are actually inclined radially inwardly in an axially rearward direction to define a series of gripping grooves which serve a purpose to be described. The diameter D of the smooth portion 30 of the stud shank portion 22 is slightly greater than the diameter D1 of the annular ridge 28 for a purpose to be described. In one form of the invention the diameter D was selected to be around 7% greater than diameter D1.

The pintailed collar 14 includes a tubular collar member, or collar portion, 32 having a tubular shank portion 33 with an enlarged flange 34 at one end and a reduced diameter shank portion 36 at its opposite end. It should be noted that in some applications a collar flange such as flange 34 may not be necessary!

A pintail member, or pintail portion, 38 is of a generally uniform diameter and has a plurality of attachment grooves 40 at one end and a plurality of pull grooves 42 at its opposite end. The pull grooves 42 can be constructed as conventional pull grooves adapted to be gripped by an installation tool and hence can be in a form used for the typical swage type lockbolt fasteners previously described.

The collar member 32 is preassembled to the pintail member 38 by swaging the reduced diameter portion 36 into the attachment grooves 40. In such case the shank portion 33 of the collar member 32 can initially be of a generally uniform diameter; the reduced diameter portion 36 is then formed upon swaging of that portion into the attachment grooves 40. In this regard the attachment grooves 40 are annular, i.e. non-helical.

In some applications the attachment grooves 40 can be in a helical thread form and it may be advantageous to provide a reduced diameter portion such as shank portion 36 to be internally threaded to facilitate a threaded connection with the attachment grooves 40. In assembly then, the collar member 32 and pintail member 38 define the pintailed collar 14 which, as will be seen, is constructed such as to permit the collar member 32 to be swaged onto the shank portion 22 of the weld stud member 12.

Figures 1A, 2:
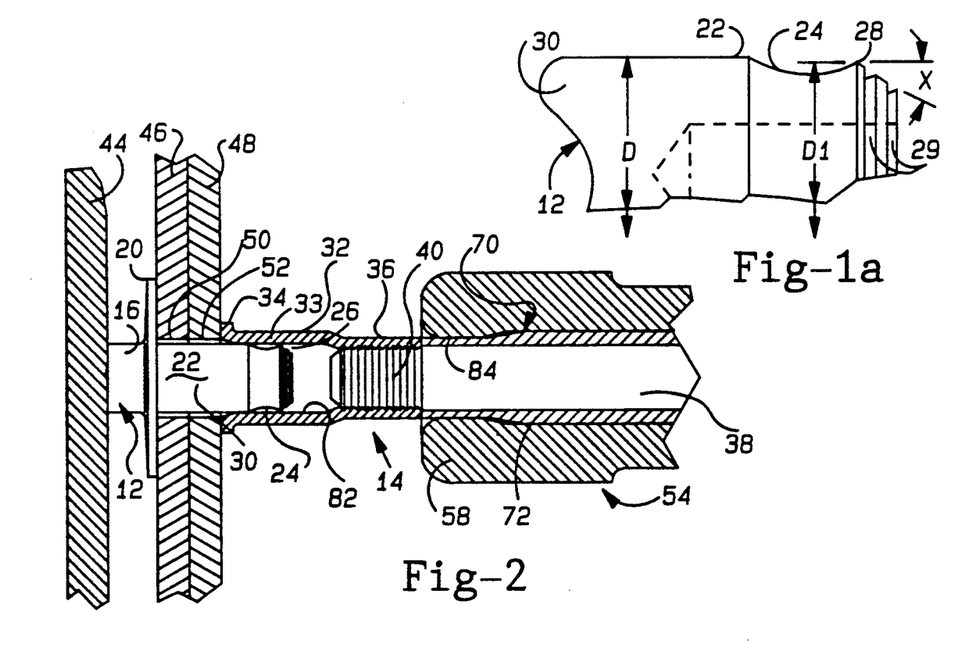

Looking now to FIG. 2, in operation the weld stud member 12 is secured to a support plate 44 by friction welding, resistance welding or other welding techniques well known in the art; in this regard the head portion 16 is welded to the support plate 44 via the weld button 18. Now workpieces 46 and 48 which are to be secured together are located on the support flange 20 with the shank portion 22 extending through aligned workpiece openings 50 and 52, respectively. Next the pintailed collar 14 can be loaded into the nose assembly 54 of an installation tool (only partially shown). Note that, except as shown, the nose assembly 54 and installation tool can be of constructions well known in the art and hence the details thereof have been omitted for purposes of simplicity.

Looking to FIGS. 1 and 2, the nose assembly 54 includes a tubular housing 56 having an elongated anvil member 58 threadably secured thereto at its outer end. A plurality of gripping jaws 60 are slidably supported in a collet 62 with mating frusto conical surfaces 64 and 66, respectively. The jaws 60 are normally resiliently urged radially inwardly via the engagement of surfaces 64 and 66 towards a closed position by a biasing means (not shown) and have a plurality of teeth 68 adapted to grippingly engage the pull grooves 42 on the pintail member 38. A collar ejector 70 has an elongated ejector nose 72 extending generally coextensively with the elongated anvil member 58 and has a flange 74 adapted to engage the forward wall 76 of the housing 56. A generally frusto conical jaw actuating portion 78 extends axially rearwardly from flange 74 and is adapted to engage similarly contoured surfaces 80 at the axially outer ends of the jaws 60. In the position shown, the actuating portion 78 acts to move and hold the jaws 60 rearwardly sufficiently to place them in an open position to permit insertion and/or loading of the pintail member 38 into the nose assembly 54.

In some installations it may be desirable to first locate a number of pintailed collars 14 on associated stud members 12 rather than separately loading the pintailed collars 14 into the nose assembly 54. In order to hold the pre-installed pintailed collar 14 onto an associated stud member 12 a slight interference fit can be provided between the collar 82 of collar shank portion 33 and the smooth portion 30 of stud shank portion 22. In one form of the invention an interference of 0.001 inches was found satisfactory. In addition, the surface of bore 82 can be slightly roughened to enhance the gripping engagement between the collar bore 82 and stud shank portion 22. In this regard the desired interference could be provided by forming the collar shank portion 33 slightly out of round in a selected location or locations and/or of a generally elliptical shape.

Figure 3:
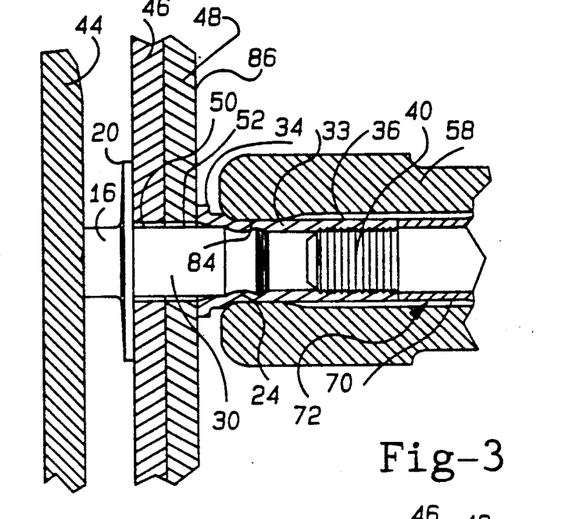
FIG. 3 is a view similar to FIG. 2 depicting the fastener assembly after the pintailed collar has been swaged onto the weld stud member.
Figure 4:
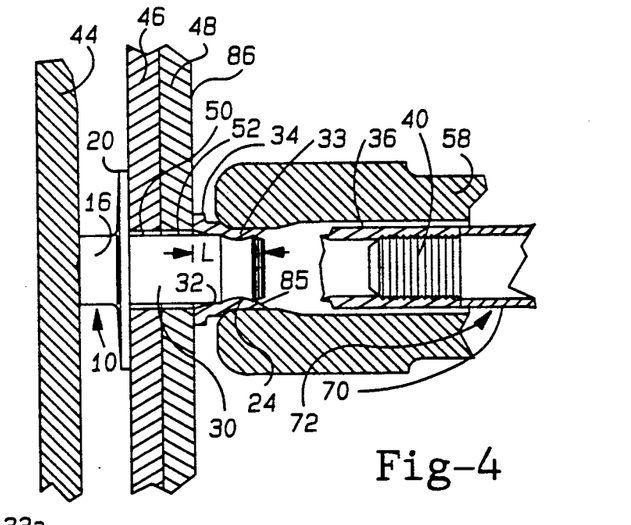
FIG. 4 is a view similar to FIG. 3 depicting the fastener assembly after the pintailed collar has been severed at a weakened portion of the collar member.

Looking now to FIGS. 2-4, upon actuation of the installation tool the collet 62 is moved axially rearwardly relative to the housing 56 whereby the jaws 60 are moved axially away from jaw actuating portion 78 of ejector 70 to a radially inwardly closed position to grip the pull grooves 42 of the pintail member 38. As this relative axial movement continues the anvil member 58 moves axially to radially overengage the collar member 32. The anvil member 58 has a reduced diameter swage cavity 84 at its forward end which is of a diameter to accept with a clearance fit the reduced diameter shank portion 36 of collar member 32. As the relative axial movement continues the swage cavity 84 overengages the larger diameter tubular shank portion 33 and initially freely deforms or swages it radially inwardly up to the tapered pin portion 26. With further axial movement of the anvil 58 and the swage cavity 84, the collar shank portion 33 is at first swaged over the tapered portion 26 and into the steps or gripping grooves 29 to initially mechanically bond the collar shank portion 33 to the tapered end 26 of the stud shank portion 22. Since the steps or grooves 29 are of a smaller diameter than the remainder of the stud shank portion 22 the collar shank portion 33 will be swaged into the gripping grooves 29 at a relatively low swage load and low, related axial load on the pintailed collar 14. It can be seen, however, that as the swage cavity 84 moves axially over the larger diameter portions of the stud shank portion 22, such as the ridge 28, the swage loads and related axial loads will increase significantly tending to pull the collar member 32 into the swage cavity 87. Thus the initial swage of the collar shank portion 33 into the gripping grooves 29 creates a sufficient mechanical bond between the collar member 32 and the stud shank portion 22 to prevent the collar member 32 from being pulled axially away from the stud shank portion 22 and into the swage cavity 84 as the swage and axial loads increase. Note that while a plurality of gripping grooves 29 are shown a single groove could be employed or some other discontinuity which would create the initial bond between the collar shank portion 33 and the stud shank portion 22. It can be seen that up to this point the relative axial force is applied between the pintail member 38 and the collar member 32 and the stud shank portion 12 is substantially free of this relative axial force and hence such force is not being applied to the workpieces 46, 48. Thus at this stage the significant relative axial force required to initiate swage is not being applied to the workpieces 46, 48. Thus the final clamp force on the workpieces 46, 48 can be selected to be of a low magnitude.

Now with the initial mechanical bond in place, as the swaging action continues, the swage cavity 84 is pulled over the collar member 32 and stud shank portion 22 whereby the collar shank portion 33 is swaged into the lock groove 24 of the stud member 12. As this occurs the annular corner 28 bites into the swaged collar material to form a weakened section or breaknotch. Next when the swage cavity 84 reaches the larger diameter smooth stud shank portion 30 the resistance to further axial movement of the swage cavity 84 over the stud shank portion 22 increases to a level at which the collar shank portion 33 is severed at the weakened portion at or adjacent to the corner 28. With the swage step completed the installation tool is actuated to return the collet 62 towards its original position. In doing so the ejector nose 72 engages the swaged, fractured end 85 of the collar member 32 moving it axially out of the swage cavity 84 releasing the nose assembly 54 from the swaged collar member 32. At the same time the jaw release portion 78 of the ejector 70 engages the gripping jaws 60 and actuates them to their radially opened position to release and permit ejection of the severed portion of the fastener 10, i.e. the pintail member 38 and severed portion of the collar member 32 attached thereto. With the installation completed, the next fastener 10 can be similarly installed.

Note in the installed condition, the overall length L of the fastener 10 which extends past the accessible surface 86 of the outer workpiece 48 will be approximately the same as that portion of the stud shank portion 22 which similarly extends past surface 86. With the embodiment of FIGS. 1-4 as shown, this extension relationship will be automatically maintained over the grip range of the fastener 10. In this regard the grip range can be considered to be the difference between the maximum and minimum combined thicknesses of workpieces such as workpieces 46 and 48. This is illustrated in FIG. 5 in which components similar to like components in the embodiment of FIGS. 1-4 have been given the same numeral designation with the addition of the postscript "a".

Figure 5:
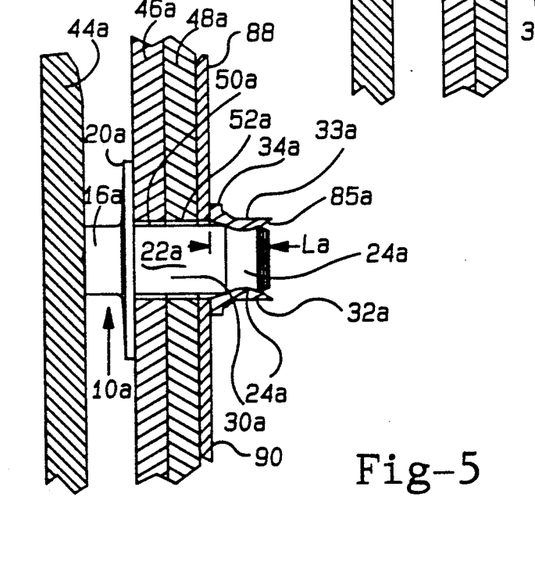
FIG. 5 is a view similar to that of FIG. 4 with the installation tool removed and depicting the set fastener assembly securing workpieces having a greater overall thickness than that of the workpieces of the fastened joint of FIGS. 2-4.

Thus in FIG. 5 the fastener 10a is identical to fastener 10 as are workpieces 46a, 48a relative to workpieces 46, 48. The total combined workpiece thickness, however, has been increased by the addition of workpiece 88. It can be seen that, as described, the collar member 32a will still be severed proximate the ridge or corner 28a and hence the overall protrusion La of the set fastener 10a from the outer surface 90 will still be generally no greater than the protrusion of the weld stud shank portion 22a beyond that surface 90.

It can be seen then that it is desirable in some applications that the length L be minimized; it is also desirable that the tensile load capability of the fastened joint be high. This can be achieved to some extent by maximizing the effectiveness of the fill of the lockgroove 24 with the swaged material of the collar member 32. In this regard then the overpacking characteristics defined in the '096 U.S. Patent to Ruhl and Dixon (previously identified) can be utilized. Thus the available volume defined by the swage cavity 84 is substantially less than the volume of the collar shank portion 33 and the pin shank portion 30 in the area of the swage cavity 84. This can require high swage loads and hence a high relative axial force between the pintail member 38 and collar member 32. Under such high axial forces the collar member 32 could simply be pulled into the swage cavity 84 without being swaged onto the pin or stud portion 22. It is in such instances that the initial bonding provided by the gripping grooves 29 is of special significance in preventing such undesired movement of the collar member 32 off of the pin or stud portion 22 and assuring the desired proper swage. It can be seen that the preceding discussion applies equally to the embodiment of FIG. 5 where a total combined thickness of the workpieces greater than that of the embodiment of FIGS. 1–4 is secured by the fastener assembly 10a which is the same as fastener assembly 10.

It should be noted that while reference was made to the application of a "high relative axial force", this force is applied between the pintail member 28 and collar member 32 and is not exerted on the workpieces 46 and 48. Thus the clamp load applied to the workpieces 46 and 48 can be relatively low. This can be especially advantageous in applications where the workpieces 46 and/or 48 are constructed of crushable materials, such as composites, which are susceptible to localized damage in the area of the fastener in response to high clamp loads.

Figure 6:
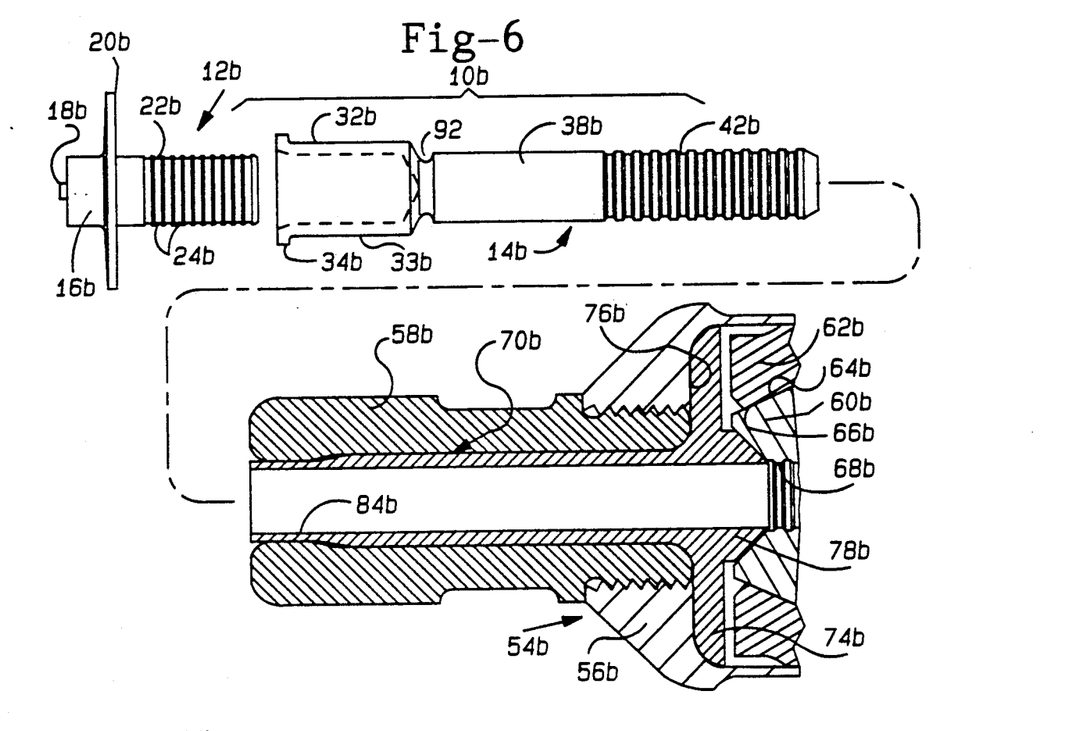
FIG. 6 is a side elevational view similar to that of FIG. 1 depicting a weld stud fastener assembly of a modified form.
Figure 7:
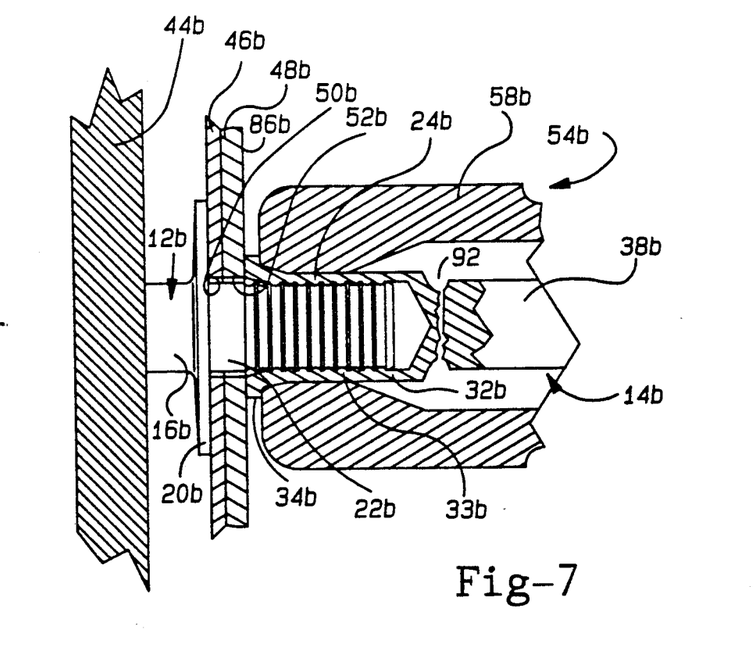
FIG. 7 is an elevational view to enlarged scale with some parts shown in section depicting the weld stud fastener assembly of FIG. 6 securing workpieces together.

A modified form of the present invention is shown in FIGS. 6 and 7 where components similar to like components in the embodiment of FIGS. 1–4 have been given the same numeral designation with the addition of the letter postscript "b"; unless described otherwise similarly numbered components in FIGS. 1–4 and 6 and 7 will be considered to be and to function the same and hence the detailed description of all such components will not be repeated.

Looking now to FIGS. 6 and 7 the weld stud fastener assembly 10b includes a modified weld stud member 12b and pintailed collar 14b. The weld stud member 12b has a head portion 16b with a weld button 18b and an enlarged support flange 20b. An elongated shank portion 22b has a plurality of annular locking grooves 24b extending generally along its length.

The pintailed collar 14b here is of a unitary, one-piece construction and includes a tubular collar portion 32b having a tubular shank portion 33b with an enlarged flange 34b at one end and a pintail portion 38b. Again, as previously noted, in some applications the enlarged flange 34b can be eliminated. The pintail portion 38b is of a generally uniform diameter and has a plurality of pull grooves 42b at its free end. The pull grooves 42b can be constructed as conventional pull grooves noted in the previously referenced lockbolt patents.

A reduced section breakneck groove 92 connects the pintail portion 38b with the collar shank portion 33b. The breakneck groove 92 provides a weakened section which functions the same as conventional breakneck grooves shown in the previously described lockbolt patents. Thus in the embodiment of FIG. 7 there is no need for a sharp ridge or corner, such as ridge 28, to assist in fracture of the excess length of the pintailed collar 14b.

Looking now to FIG. 7, in operation, the weld stud member 12b is secured to a support plate 44b by welding techniques well known in the art. Now workpieces 46b and 48b are located on the support flange 20b with the shank portion 22b extending through aligned workpiece openings 50b and 52, respectively. Next the nose assembly 54b of the installation tool is applied to the pintailed collar 14b which is located on the shank portion 22b of the weld stud member 12b.

Upon actuation of the installation tool the collet 62b is moved axially rearwardly relative to the housing 56b whereby the jaws 60b are moved axially away from jaw actuating portion 78b of ejector 70b to a radially inwardly closed position to grip the pull grooves 42b of the pintail portion 38b. As this relative axial movement continues the anvil member 58b moves axially to radially overengage the tubular shank portion 33b of the collar portion 32b. With further axial movement of the anvil 58b and the swage cavity 84b, the collar shank portion 33b is swaged into the lock grooves 24b of the stud portion 22b. Upon swage of the collar shank portion 33b into the first one or more of the lock grooves 52b the collar portion 32b is mechanically held to the stud portion 22 sufficiently to resist its being pulled off of the stud portion 22b. In addition the degree of overpacking in swage of the collar shank portion 33b into the lockgrooves 24b can be less than the embodiment of FIGS. 1–5 thereby reducing the required relative axial force for swage and reducing the tendency of the collar portion 32b to be pulled off of the pin or stud shank portion 22b. When the outer end 91 of the anvil member 58b engages the collar flange 34b (or the outer surface 86b of workpiece 48b in the absence of a flange such as flange 34b), the resistance to further axial movement of the swage cavity 84b increases to a level at which the pintail portion 38b is severed at the breakneck groove 92. With the swage step completed the installation tool is actuated to return the collet 62b towards its original position releasing the nose assembly 54b from the swaged collar shank portion 33b and ejecting the severed pintail portion 38b.

Note that with the construction of FIGS. 6 and 7 the workpieces 46b and 48b will be clamped together under a higher final load in view of the more extensive swaging and resultant elongation of the swaged collar shank portion 33b. In addition the swaged collar shank portion 33b by engaging more lockgrooves 24b will provide a higher tensile load capability to the resultant fastened joint.

Figure 7A:
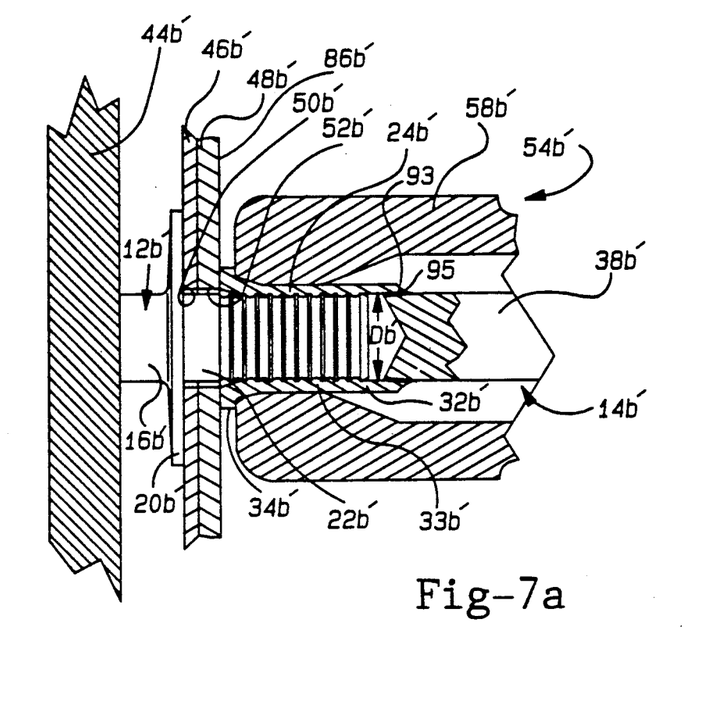
FIG. 7A is an elevational view similar to that of FIG. 7 depicting a fastener assembly utilizing a modified form of pintailed collar.

A modified form of the embodiment of FIG. 7 is shown in FIG. 7a where components similar to like components and serving similar functions are given the same numerical designation with the addition of a prime. Except as described, the embodiment of FIG. 7a is the same as that of FIG. 7 and hence a repetition of the detailed description is omitted for purposes of brevity and simplicity.

Thus in FIG. 7a no breakneck groove 92 is provided and the collar shank portion 33b' is connected to the pintail portion 38b' with a generally uniform transition area 95; the diameter of pintail portion 38b' in the transition area 95 is generally the same as the inside diameter Db' of the collar shank portion 33b' after it has been swaged. This defines an annular web 93 which is generally in axial alignment with the outside diameter surface of the transition area 95. The annular web 93 selected to have a resultant cross-section such as to fail in shear at a preselected axial load after swaging is complete.

Figure 8:
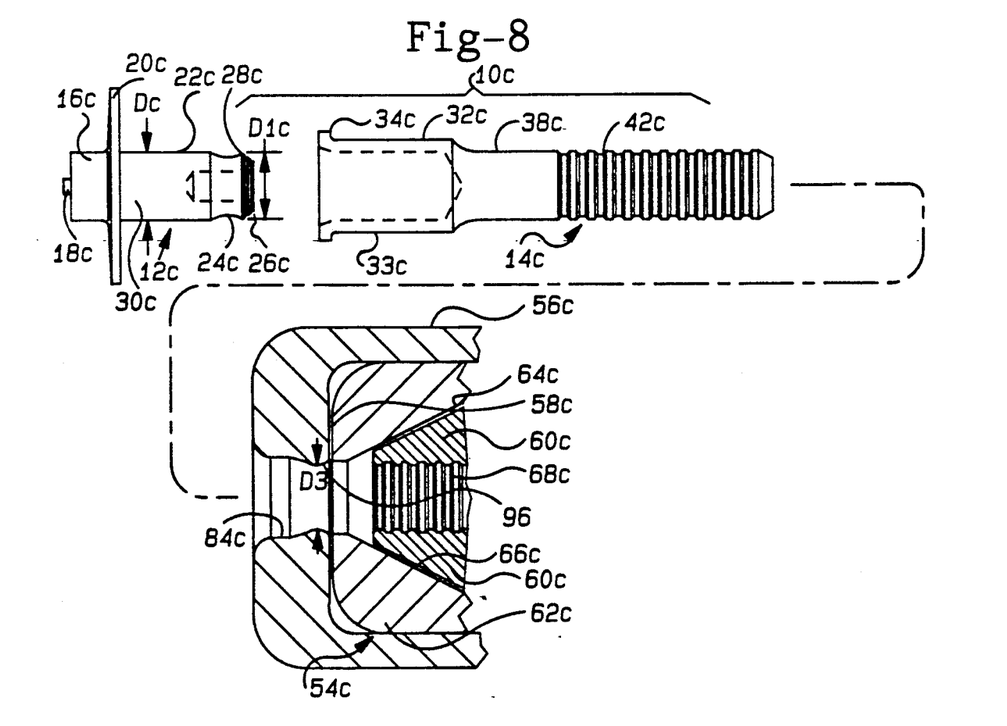
FIG. 8, is an exploded side elevational view, similar to FIG. 1, of a modified form of fastener assembly and installation and modified installation tool for setting such fastener assembly.
Figures 9, 10:
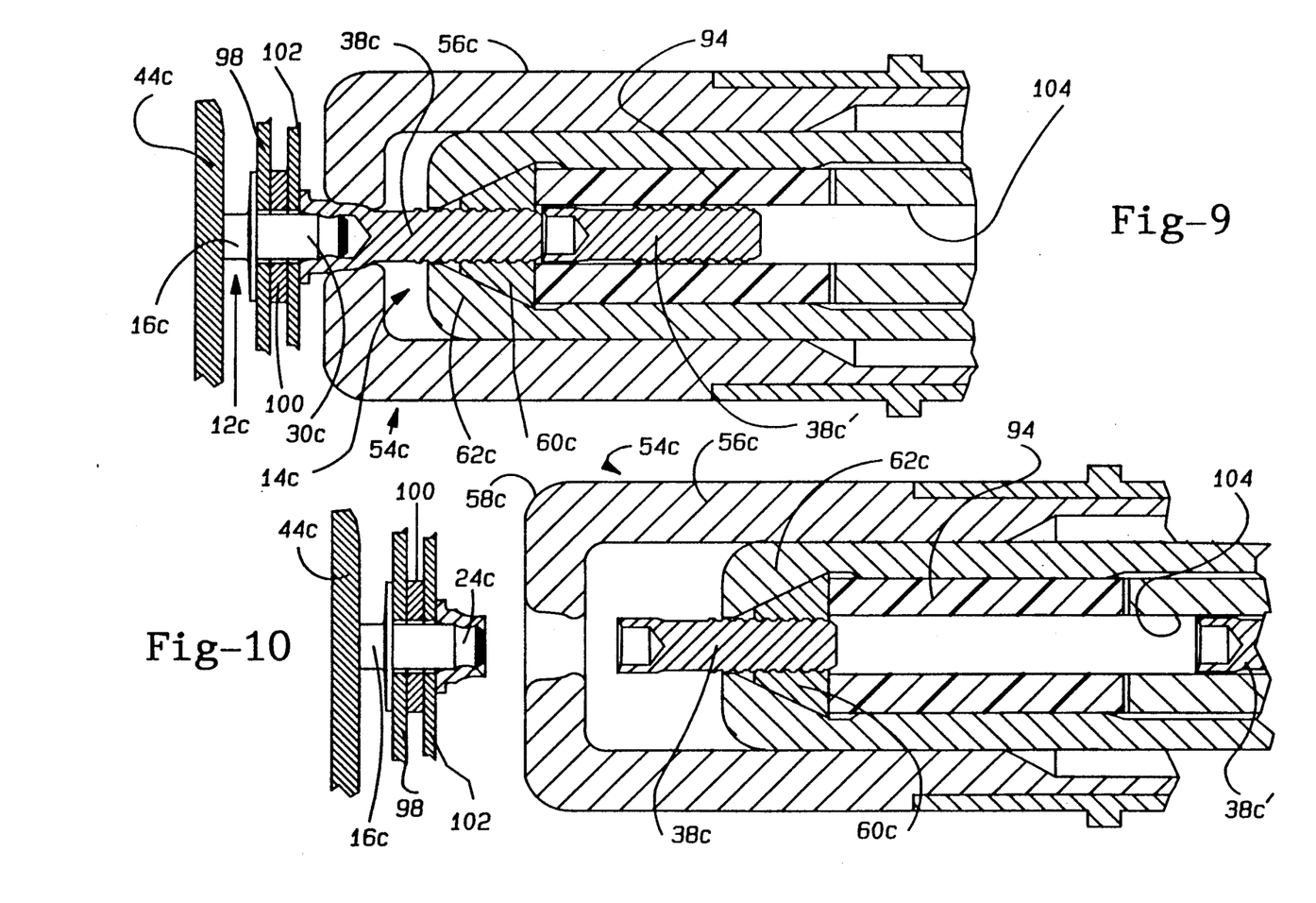
FIG. 9 is a longitudinal sectional view of the fastener assembly and installation tool of FIG. 8 depicting the fastener assembly after the collar portion has been swaged to the weld stud member.
FIG. 10 is a longitudinal sectional view of the fastener assembly and installation tool of FIG. 9 depicting the completion of the installation of the fastener assembly.

Another modified form of the present invention is shown in FIGS. 8–10 where components similar to like components in the embodiments of FIGS. 1–7 have been given the same numeral designation with the addition of the letter postscript "c"; unless described otherwise similarly numbered components in FIGS. 1–7 and 8–10 will be considered to be and to function the same and hence the detailed of all such components will not be repeated.

Looking now to FIGS. 8–10, a weld stud fastener 10c includes a weld stud member 12c and a pintailed collar 14c. The weld stud member 12c can be substantially the same as either the weld stud member 12 of FIGS. 1–5 or the weld stud member 12b of FIGS. 6 and 7. In the embodiment of FIGS. 8–10, the weld stud member 12c is shown to be the same as weld stud member 12 and hence the details of its description shall be omitted for simplicity.

In addition, the pintailed collar 14c is generally the same as the pintailed collar 14b of FIGS. 6 and 7 except that the pintailed collar 14c does not have a breakneck groove such as breakneck groove 92. Since it is substantially the same in all other respects, the detailed description of pintailed collar 14c will be omitted for purposes of simplicity.

Looking to FIGS. 8–10, the nose assembly 54c of an installation tool includes a tubular housing 56c having an anvil portion 58c at its forward end. The nose assembly 54c can generally be of the type shown and described in U.S. Pat. No. 4,347,728 issued on Sep. 7, 1982 to W. Smith for Apparatus and System for Setting Fasteners. A plurality of gripping jaws 60c are slidably supported in a collet 62c with mating frusto conical surfaces 64c and 66c, respectively. The jaws 60c are resiliently secured to the forward end of an elastomeric sleeve member 94 which normally locates the jaws 60c such that the surfaces 64c and 66c are out of engagement; the jaws 60c have a plurality of teeth 68c adapted to grippingly engage the pull grooves 42c on the pintail portion 38c. In the position shown in FIG. 8, the jaws 60c are in a generally opened position and, as noted, with the surfaces 64c, 66c slightly out of engagement. The insertion and/or loading of the pintail portion 38c into the nose assembly 54c is simply accomplished since the jaws 60c can be opened even further by overcoming the relatively light force applied to the jaws 60c by the resilient connection with the elastomeric sleeve member 94.

Looking now to FIGS. 9 and 10, upon actuation of the installation tool the collet 62c is moved axially rearwardly relative to the housing 56c whereby the jaws 60c are urged radially inwardly to tightly grip the pull grooves 42c of the pintail portion 38c. As this relative axial movement continues the anvil portion 58c moves axially to radially overengage the collar shank portion 33c. The anvil portion 58c has a swage cavity 84c. As the relative axial movement continues the swage cavity 84c overengages the tubular collar shank portion 33c and initially freely deforms or swages it radially inwardly up to the tapered pin portion 26c. With further axial movement of the anvil portion 58c and the swage cavity 84c, the collar shank portion 33c is swaged into the lock groove 24c of the stud member 12. As before, as this occurs the annular corner 28c bites into the swaged collar material to form a weakened section. The swage cavity 84c terminates at its axially inner end in a reduced diameter shoulder portion 96. The diameter D3 of the shoulder portion 96 is generally slightly larger than the outer diameter of the pull groove 42c. Thus when the cavity shoulder portion 96 engages the axially outer end of the collar portion 32c it pinches the already weakened collar section at the ridge 28c. This terminates the swaging action and results in severance of the pintailed collar 38c at this weakened section. At the same time the swage cavity 84c reaches smooth stud shank portion 30c of larger diameter Dc which adds further resistance to axial movement of the swage cavity 84c over the stud shank portion 22c to assist in severing the collar shank portion 33c at the weakened portion at or adjacent to the corner or ridge 28c. Thus the extent of swage of the collar shank portion 33c onto the stud shank portion 30c is limited to provide a consistently controlled clamp load on the workpieces 98, 100, and 102. With the swage step completed the installation tool is removed from the swaged collar portion 32c to complete the installation.

Note that the nose assembly 54c has a through opening 104 to permit ejection of the severed pintail portion 38c through the back end of the nose assembly 54c. This occurs automatically when a next fastener assembly 10c is to be installed simply by axially pushing the next pintail portion 38c against the previously severed pintail portion 38c' releasing the latter from the jaws 62c and ejecting it through the back end of the nose assembly 54c; the ejection of such a prior severed pintail portion 38c' is shown in FIGS. 9 and 10. The diameter D3 of the shoulder portion 96 is selected to reduce the diameter of the severed portion of the collar shank portion 33c to approximately the diameter of the pintail portion 38c so that the severed collar portion can readily pass through the jaws 60c and hence through the ejection opening 104.

It should be noted that in the various forms of the fastener assembly shown and described, the pin or stud member (such as stud member 12) can be made of materials generally similar to those used for lockbolt pins known in the art and at the same time the pintailed collar (such as pintailed collar 14b) can be made of materials generally similar to those used for lockbolt collars known in the art. In the embodiments of FIGS. 1–5, however, the pintail member 38 can be made of a material different from the collar member 32. Also in some applications it may be feasible to reuse the pintail member 38 with a different new collar member 32 to be swaged.

While it will be apparent that the preferred embodiments of the invention disclosed are well calculated to fulfill the objects stated above, it will be appreciated that the invention is susceptible to modification, variation and change without departing from the proper scope or fair meaning of the invention.

What is claimed:

1. A multipieced fastener for securing a plurality of workpieces together by an installation tool adapted to apply a relative axial force to the fastener with the installation tool having a swaging structure for swaging parts of the fastener together in response to the relative axial force, the fastener comprising:
a pin member having an elongated pin shank portion,
a collar member operably associated with said pin member and adapted to be located on said pin shank portion,
a pintail member separate from said pin member and operatively connected with said collar member and adapted to be gripped by the installation tool whereby the installation tool can apply a relative axial force of a first preselected magnitude between said collar member and said pintail member to actuate the swaging structure to swage said collar member onto said pin shank portion.

2. The multipieced fastener of claim 1 with said pintail member being a member separate from but secured to said collar member.

3. The multipieced fastener of claim 1 with said pintail member and said collar member being of a one-piece, unitary construction.

4. The multipieced fastener of claim 1 with said pin member having a lock groove portion adapted to receive the swaged material of said collar member, said pintail member having a breakneck groove configured to fracture in response to the relative axial force attaining a second preselected magnitude greater than said first preselected magnitude at which said collar member is swaged into said lock groove portion.

5. The multipieced fastener of claim 1 with said pin member having a lock groove portion adapted to receive the swaged material of said collar member, said collar member having a tubular collar shank portion terminating in an end wall portion, said end wall portion being connected with said pintail member and configured to fracture in response to the relative axial force attaining a second preselected magnitude greater than said first preselected magnitude at which said collar member is swaged into said lock groove portion.

6. The multipieced fastener of claim 5 with said pintail member and said collar member being of a one-piece, unitary construction.

7. The multipieced fastener of claim 1 with said collar member having a tubular collar shank portion adapted to receive said pin shank portion, said tubular collar shank portion having a preselected interference with said pin shank portion whereby said collar member with said pintail member can be located onto said pin shank portion in gripping engagement and held in preassembled relationship to facilitate installation by the installation tool.

8. A multipieced fastener for securing a plurality of workpieces together by an installation tool adapted to apply a relative axial force to the fastener with the installation tool having a swaging structure for swaging parts of the fastener together in response to the relative axial force, the fastener comprising:
a pin member having an elongated pin shank portion,
a collar member operably associated with said pin member and adapted to be located on said pin shank portion,
a pintail member separate from said pin member and operatively connected with said collar member and adapted to be gripped by the installation tool whereby the installation tool can apply a relative axial force of a first determinable magnitude between said collar member and said pintail member to actuate the swaging structure to swage said collar member onto said pin shank portion,
said pin member having an enlarged head portion at one end of said pin shank portion,
said pin member having a lock groove portion adapted to receive the swage material of said collar member upon swaging of said collar member in response to the relative axial force of said first determinable magnitude,
said pin member having gripping means at the end of said pin shank portion opposite from said head portion for receiving swaged material of said collar member at a second determinable magnitude of relative axial force less than said first determinable magnitude whereby pulling of said collar member off from said pin shank portion by said pintail member is resisted.

9. The multipieced fastener of claim 8 with said gripping means comprising at least one gripping groove defined by a structure having a diameter less than that of the structure defining said lockgroove portion.

10. The multipieced fastener of claim 8 with said opposite end of said pin with said gripping means being tapered generally at an angle of around 15° with a line transverse to the longitudinal axis of said pin shank portion.

11. The multipieced fastener of claim 8 with said gripping means comprising at least one gripping groove defined by a structure having a diameter less than that of the structure defining said lockgroove portion, said opposite end of said pin with said gripping means being tapered generally at an angle of around 15° with a line transverse to the longitudinal axis of said pin shank portion.

12. The multipieced fastener of claim 10 with said pin shank portion having a generally uniform portion adjacent said lockgroove portion with said uniform portion being of a diameter greater than the outer end section of said pin shank portion including said lockgroove portion and said opposite end with said gripping means whereby swage of said collar member onto said uniform portion is inhibited.

13. The multipieced fastener of claim 12 with said uniform portion being of a diameter generally around 7% greater than the diameter of said outer end section.

14. A multipieced fastener for securing a plurality of workpieces together by an installation tool adapted to apply a relative axial force to the fastener with the installation tool having a swaging structure for swaging parts of the fastener together in response to the relative axial force, the fastener comprising:
a pin member having an elongated pin shank portion,
a collar member operably associated with said pin member and adapted to be located on said pin shank portion,
a pintail member separate from said pin member and operatively connected with said collar member and adapted to be gripped by the installation tool whereby the installation tool can apply a relative axial force of a first determinable magnitude between said collar member and said pintail member to actuate the swaging structure to swage said collar member onto said pin shank portion,
said pin member having an enlarged head portion at one end of said pin shank portion, said pin member having a lock groove portion adapted to receive the swage material of said collar member in response to the relative axial force of said first determinable magnitude, said pin member having groove forming means at the end of said pin shank portion opposite from said head portion for forming a weakened breaknotch groove in said collar member as it is swaged onto said pin shank portion whereby said collar member will fracture at said breaknotch groove at a relative axial force of a third determinable magnitude greater than said first determinable magnitude, said lock groove portion located on said pin shank portion between said groove forming means and said head portion.

15. The multipieced fastener of claim 14 with said pin member having gripping means at the end of said pin shank portion opposite from said head portion for receiving swaged material of said collar member at a second determinable magnitude of relative axial force less than said first determinable magnitude whereby pulling of said collar member off from said pin shank portion by said pintail member is resisted.

16. The multipieced fastener of claim 14 with said groove forming means being defined by a ridge having an included angle of between around 30° to around 45°.

17. The multipieced fastener of claim 14 with said pin member having gripping means at the end of said pin shank portion opposite from said head portion for receiving swaged material of said collar member at a second determinable magnitude of relative axial force less than said first determinable magnitude whereby pulling of said collar member off from said pin shank portion by said pintail member is resisted, said opposite end of said pin with said gripping means being tapered generally at an angle of around 15° with a line transverse to the longitudinal axis of said pin shank portion.

18. The multipieced fastener of claim 14 with said pin member having gripping means at the end of said pin shank portion opposite from said head portion for receiving swaged material of said collar member at a second determinable magnitude of relative axial force less than said first determinable magnitude whereby pulling of said collar member off from said pin shank portion by said pintail member is resisted, said opposite end of said pin with said gripping means being tapered generally at an angle of around 15° with a line transverse to the longitudinal axis of said pin shank portion, said groove forming means being defined by a ridge having an included angle of between around 30° to around 45°.

19. A multipieced fastener for securing a plurality of workpieces together by an installation tool adapted to apply a relative axial force to the fastener with the installation tool having a gripping structure for gripping a member of the fastener and having a swaging structure with a swage cavity for swaging parts of the fastener together in response to the relative axial force applied between the gripping structure and the swage structure, the fastener comprising:

a pin member having an elongated pin shank portion, a collar member operably associated with said pin member and having a tubular shank portion adapted to be located on said pin shank portion and engaged by the swage structure, a pintail member separate from said pin member and operatively connected with said collar member and adapted to be gripped by the gripping structure of the installation tool whereby the installation tool can apply a relative axial force of a first determinable magnitude between said collar member and said pintail member via the gripping structure and swage structure to actuate the swaging structure to move axially to radially overengage said collar member by said swage cavity to thereby swage said tubular shank portion onto said pin shank portion, said pin member having an enlarged head portion at one end of said pin shank portion, said pin member having a lock groove portion adapted to receive the swage material of said collar member upon swaging of said tubular shank portion in response to the relative axial force of said first determinable magnitude, said pin member having gripping means at the end of said pin shank portion opposite from said head portion for receiving swaged material of said tubular shank portion of said collar member at a second determinable magnitude of relative axial force less than said first determinable magnitude whereby pulling of said collar member off from said pin shank portion and into said swage cavity by said pintail member is resisted.

20. The multipieced fastener of claim 19 with said gripping means comprising at least one gripping groove defined by a structure having a diameter less than that of the structure defining said lockgroove portion.

21. The multipieced fastener of claim 20 with said opposite end of said pin with said gripping means being tapered generally at an angle of around 15° with a line transverse to the longitudinal axis of said pin shank portion.

22. In a fastening system for securing a plurality of workpieces together under a relatively low clamp force, said fastening system comprising:

(1) a multipieced fastener including:
 (a) a pin member having an elongated pin shank portion,
 (b) a collar member operably associated with said pin member and having a tubular shank portion adapted to be located on said pin shank portion, and
 (c) a pintail member separate from said pin member and operatively connected with said collar member, (2) an installation tool including:
 (a) gripping means for gripping said pintail member, and
 (b) swage means adapted to engage said collar member and having a swage cavity adapted to radially overengage said collar member to swage said collar member onto said pin member, said installation tool being actuable to apply a relative axial force of a first preselected magnitude between said collar member and said pintail member to axially move said swage means to radially overengage said collar member with said swage cavity to swage said tubular shank portion onto said pin shank portion with said first preselected magnitude of relative axial force being applied substantially between said pintail member and said collar member whereby the clamp load applied to said workpieces by the swaged connection between said collar member and said pin member can be relatively low.

23. The fastening system of claim 22 with said swage cavity of said installation tool having a radially inwardly extending shoulder adapted to engage the end of said collar member in general axial alignment with the end of said pin shank portion to resist further relative movement of said swage cavity over said collar member to provide a predetermined axial length of swage of said collar member whereby the clamp load on said workpieces can be provided at a relatively low magnitude.

* * * * *